(12) United States Patent
Jin et al.

(10) Patent No.: US 6,283,812 B1
(45) Date of Patent: Sep. 4, 2001

(54) PROCESS FOR FABRICATING ARTICLE COMPRISING ALIGNED TRUNCATED CARBON NANOTUBES

(75) Inventors: Sungho Jin, Millington; Gregory Peter Kochanski, Dunellen; Wei Zhu, Warren, all of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/236,933

(22) Filed: Jan. 25, 1999

(51) Int. Cl.$^7$ .................................................. H01J 9/02
(52) U.S. Cl. ................................. 445/24; 445/51
(58) Field of Search ........................... 455/24, 51

(56) References Cited

U.S. PATENT DOCUMENTS

| | | |
|---|---|---|
| 4,940,916 | 7/1990 | Borel et al. . |
| 5,089,742 | 2/1992 | Kirkpatrick et al. . |
| 5,129,850 | 7/1992 | Kane et al. . |
| 5,138,237 | 8/1992 | Kane et al. . |
| 5,283,500 | 2/1994 | Kochanski . |
| 5,346,683 * | 9/1994 | Green et al. ............... 423/447.2 |
| 5,653,951 | 8/1997 | Rodriquez et al. . |
| 5,681,196 | 10/1997 | Jin et al. . |
| 5,698,934 | 12/1997 | Jin et al. . |
| 5,773,834 | 6/1998 | Yamamoto et al. . |
| 5,773,921 | 6/1998 | Keesmann et al. . |
| 5,872,422 | 2/1999 | Xu et al. ........................ 313/311 |
| 6,090,363 * | 7/2000 | Green et al. ............... 423/446.1 |

FOREIGN PATENT DOCUMENTS

| | | |
|---|---|---|
| 4405768A1 | 2/1994 | (DE) . |
| 19745549 | 4/1999 | (DE) . |
| 0905737 | 3/1999 | (EP) . |
| WO9600974 | 1/1996 | (WO) . |
| WO9609246 | 3/1996 | (WO) . |
| WO9718577 | 11/1996 | (WO) . |
| WO9811588 | 3/1998 | (WO) . |

OTHER PUBLICATIONS

U.S. application No. 09/420,157, filed Oct. 18, 1999.
*Semiconductor International*, p. 46 (1991).
Spindt, C.A. et al., *IEEE Transactions on Electron Devices*, vol. 38, 2355 (1991).
*Advances in Electronics and Electron Physics*, edited by Peter W. Hawkes, vol. 83, p. 75 (1992).
Costellano, J.A. *Handbook of Display Technology*, Academic Press, pp254–257 (1992).
Rinzler, et al., "Unraveling Nanotubes: Field Emission from an Atomic Wire", *Science*, vol. 269, 1550 (1995).
DeHeer et al., "A Carbon Nanotube Field–Emission Electron Source", *Science*, vol. 270, 1179 (1995).
Saito, et al., "Cathode Ray Tube Lighting Elements with Carbon Nanotube Field emitters", *Jpn. J. Appl. Phys.*, vol. 37, L346 (1998).
Wang et al., "A nanotube–based field–emission flat panel display", Appl. Phys. Lett., vol. 72, 2912 (1989).
Wang, Q. H. et al., "Field emission from nanotube bundle emitters at low fields", *Appl. Phys, Lett.* 70 (24), pp. 3308–3310 (1997).
Yakobson, B.I. et al., "Fullerene Nanotubes: $C_{1,000,00}$ and Beyond" *American Scientist*, vol. 85 p. 324 (1997).

(List continued on next page.)

*Primary Examiner*—Kenneth J. Ramsey
(74) *Attorney, Agent, or Firm*—Scott J. Rittman

(57) ABSTRACT

The emission properties of aligned nanotube arrays are improved by truncating the ends of the nanotubes. Truncation provides nanotubes having a height within, for example, 30% of the average truncated nanotube height, as well as ends substantially free of end caps. The cap-free ends provide desirable field concentration, and the height uniformity increases the number of participating nanotubes.

16 Claims, 5 Drawing Sheets-

OTHER PUBLICATIONS

Bonard, J-M. et al., "Field emission from single–wall carbon nanotube films", *Appl. Phys. Lett.*, vol. 73, No. 7, pp. 918–920 (1998).

Bonard, J-M. et al., "Field–Emission–Induced Luminescence from Carbon Nanotubes", *Physical Review Lett.*, vol. 81, No. 7, pp. 1441–1444 (1998).

Collins, P.G. et al., "Unique characteristics of cold cathode carbon–nanotube–matrix filed emitters" *Physical Review B*, vol. 55, No. 15, p. 9391 (1997).

Collins, P.G. et al., "A simple and robust electron beam source from carbon nanotubes", *Appl. Phys, Lett.* No. 69 (13) pp. 1969–1971 (1996).

Saito, Y. et al. "Field Emission Patterns from Single–Walled Carbon Nanotubes", *Jpn. J. Appl. Phys.* vol. 36 (1997).

*Semiconductor International*, p. 44 (1998).

Li, W.Z. et al., "Large–Scale Synthesis of Aligned Carbon Nanotubes", *Science*, vol. 274, pp. 1701–1703 (1996).

Ren, Z.F. et al. "Synthesis of Large Arrays of Well–Aligned Carbon Nanotubes on Glass," *Science*, vol. 282, pp. 1105–1107 (1998).

De Heer, W.A. et al., "Aligned Carbon Nanotube Films: Production and Optical and Electronic Properties", *Science*, vol. 268, pp. 845–847 (1995).

Dahn, J.R. et al., "Mechanisms for Lithium Insertion in Carbonaceous Materials", *Science*, vol. 270, pp. 590–593 (1995).

Sato, K. et al., "A Mechanism of Lithium Storage in Disordered Carbons", *Science*, vol. 264, pp. 556–558 (1994).

Dillon, A.C. et al., "Storage of hydrogen in single–walled carbon nanotubes", *Nature*, vol. 386, pp. 377–379 (1997).

Ajayan, P.M. et al., "Opening carbon nanotubes with oxygen and implications for filling", *Nature*, vol. 362, pp. 522–525 (1993).

U.S. Patent Application, Jin 174–47–43.

Fishbine, B.H. et al., "Buckytube Cold Field Emitter Array Cathode Experiments" Materials Research Society Symposium Proceedings, vol. 359 (1995).

Rinzler, A.G. et al., "Unraveling Nanotubes: Field From An Atomic Wire", *Science, U.S. American Association For The Advancement Of Science*, vol. 269, pp. 1550–1553 (1995).

Heer De, W.A., "Aligned Carbon Nanotube films: Production and Optical and Electronic Properties", *Science*, vol. 268, pp. 845–847 (1995).

\* cited by examiner

PROCESS FOR FABRICATING ARTICLE COMPRISING ALIGNED TRUNCATED CARBON NANOTUBES

BACKGROUND OF THE INVENTION

1. Field of the Invention

This invention pertains to devices comprising electron field emitters, in particular, field emitters containing carbon nanotubes.

2. Discussion of the Related Art

Electron field emitters are useful for a variety of applications including microwave-amplifiers and flat-panel, field-emission displays.

Microwave vacuum tube devices, such as power amplifiers, are essential components of many modern microwave systems including telecommunications, radar, electronic warfare, and navigation systems. While semiconductor microwave amplifiers are available, they generally lack the power capabilities required by most microwave systems. Microwave tube amplifiers, in contrast, provide microwave energy at much higher power levels. The higher power levels of tube devices are the result of the fact that electrons travel at a much higher velocity in a vacuum than in a semiconductor. The higher speed permits use of larger structures with the same transit time. Larger structures, in turn, permit greater power levels.

Microwave tube devices typically operate by introducing a beam of electrons into a region where the beam interacts with an input signal, and then deriving an output signal from the modulated electron beam. See, e.g., A. W. Scott, *Understanding Microwaves*, Ch. 12, John Wiley & Sons (1993), the disclosure of which is hereby incorporated by reference. Microwave tube devices include traveling wave tubes, gridded tubes, klystrons, cross-field amplifiers and gyrotrons. The usual source of electrons for microwave tube devices is a thermionic emission cathode, typically formed from tungsten cathodes, optionally coated with barium oxide or mixed with thorium oxide. The cathode is heated to a temperature around 1000° C. to produce thermionic electron emission on the order of amperes per square centimeter.

The requisite heating of thermionic cathodes causes a number of problems. Cathode lifetime is limited because key constituents of the cathode, such as barium oxide, evaporate under the high operating temperatures, and when the barium is depleted, the cathode (and hence the tube) no longer perform. Many traveling wave tubes (TWTs), for example, have operating lives of less than a year. Also, the need to raise the cathode to the operating temperature causes emission delays of up to several minutes, which is not acceptable for most commercial applications. In addition, the high temperature operation generally requires a peripheral cooling system, such as a fan, thereby increasing the size of the overall device or system. It would therefore be desirable to develop microwave tube devices that do not require such high temperature operation, e.g., cold cathode devices.

Another promising application of field emitters is thin, matrix-addressable, flat panel displays. See, for example, *Semiconductor International*, December 1991, p.46; C. A. Spindt et al., *IEEE Transactions on Electron Devices*, Vol. 38, 2355 (1991); I. Brodie and C. A. Spindt, *Advances in Electronics and Electron Physics*, edited by P. W. Hawkes, Vol. 83, pp. 1 (1992); and J. A. Costellano, Handbook of Display Technology, Academic Press, 254 (1992); and U.S. Pat. Nos. 4,940,916; 5,129,850; 5,138,237 and 5,283,500, the disclosures of which are hereby incorporated by reference.

A variety of characteristics are known to be advantageous for cathode materials of field emission devices. The emission current is advantageously voltage controllable, with driver voltages in a range obtainable from "off the shelf" integrated circuits. For typical device dimensions (e.g. 1 $\mu$m gate-to-cathode spacing), a cathode that emits at fields of 25 V/$\mu$m or less is generally desirable for typical CMOS circuitry. The emitting current density is advantageously in the range of 1–10 mA/cm$^2$ for flat panel display applications and >100 mA/cm$^2$ for microwave power amplifier applications. The emission characteristics are advantageously reproducible from one source to another and advantageously stable over a very long period of time (tens of thousands of hours). The emission fluctuations (noise) are advantageously small enough to avoid limiting device performance. The cathode is advantageously resistant to unwanted occurrences in the vacuum environment, such as ion bombardment, chemical reaction with residual gases, temperature extremes, and arcing. Finally, the cathode manufacturing is advantageously inexpensive, e.g. no highly critical processes and adaptable to a wide variety of applications.

Conventional field emission cathode materials are typically made of metal (such as Mo) or semiconductor material (such as Si) with sharp tips of submicron size. While useful emission characteristics have been demonstrated for these materials, the control voltage required for emission is relatively high (around 100 V) because of their high work functions and relatively dull (i.e., insufficiently sharp) tips. This high voltage operation increases the damaging instabilities due to ion bombardment and surface diffusion on the emitter tips and necessitates high power densities to be supplied from an external source to produce the required emission current density. The fabrication of uniform sharp tips is difficult, tedious and expensive, especially over a large area. In addition, the vulnerability of these materials to conditions of a typical operating environment, e.g., ion bombardment, reaction with chemically active species, and temperature extremes, is of concern.

Carbon materials (diamond and carbon nanotubes) have recently emerged as potentially useful electron field emitters. Diamond offers advantages due to the negative or low electron affinity on its hydrogen-terminated surfaces, but the technological advances have been somewhat slow because of emission non-uniformity and the tendency for graphitization in diamond emitters at increased emission currents, e.g., above about 30 mA/cm$^2$.

Carbon nanotubes feature a high aspect ratio (>1,000) and a small tip radii of curvature (~5–50 nm). These geometric characteristics, coupled with the high mechanical strength and chemical stability of the tubules, make carbon nanotubes attractive as electron field emitters. See, e.g., German patent No. 4,405,768; Rinzler et al., *Science*, Vol. 269, 1550 (1995); De Heer et al., *Science*, Vol. 270, 1179 (1995); Saito et al., *Jpn. J. Appl. Phys.*, Vol. 37, L346 (1998); Wang et al., *Appl. Phys. Lett.*, Vol. 70, 3308 (1997); Saito et al., *Jpn. J. Appl. Phys.*, Vol. 36, L1340 (1997); and Wang et al., *Appl. Phys. Lett.*, Vol. 72, 2912 (1998), the disclosures of which are hereby incorporated by reference. Unfortunately, carbon nanotubes are typically available in the form of needle-like or spaghetti-like powders which are not easily or conveniently incorporated into a field emitter device structure. However, processes such as chemical vapor deposition have recently been used to successfully fabricate aligned nanotube ensembles on substrates. See, e.g., Ren et al., *Science*, Vol. 282, 1105 (1998); Li et al., *Science*, Vol. 274, 1701 (1996); and deHeer et al., *Science*, Vol. 268, 845 (1995). The emission properties of such aligned nanotube ensembles have not been optimized, however, and processes for improving the emission properties of such aligned nanotube ensembles are therefore desired.

SUMMARY OF THE INVENTION

The invention provides for improved emission properties in aligned nanotube ensembles. Specifically, the recently-discovered processes for fabricating aligned nanotube ensembles provide nanotubes exhibiting some undesirable properties. In particular, the nanotube ends tend to be capped by metal particles or relatively large regions of carbon, and the nanotubes themselves exhibit non-uniform height. (Capped does not include nanotubes spherically terminated with a carbon hemisphere having a diameter equal to or less than the diameter of the nanotube itself.) The capped ends tend to reduce the field concentration compared to open, e.g., broken, ends or carbon-terminated spherical ends of small diameter, and the non-uniform height causes taller nanotubes to electrically shield shorter nanotubes, thereby reducing the number of nanotubes participating in emission. (Aligned indicates that the average deviation from perfect alignment normal to the supporting surface, at the point on the surface from which the nanotube protrudes, is less than 30°, as determined, for example, using high-resolution scanning electron microscopy.)

The invention, however, by truncating the ends of such aligned nanotube ensembles, provides improved emitter structures. Specifically, truncation provides nanotubes having a height uniformity within 30% of the average nanotube height (as measured from the surface of the supporting substrate), and also provides a nanotube ensemble in which at least 10% of the nanotubes are free of end caps, advantageously at least 50%. The resulting truncated ends provide desirable field concentration, and the resulting uniformity in height increases the number of participating nanotubes. Truncation is performed by any suitable technique. In one embodiment, a high energy beam is used to truncate the nanotubes of an aligned nanotube ensemble (FIG. 1). It is also possible to burn off a top portion of the nanotubes by selective heating in an oxidizing atmosphere (FIG. 2). Alternatively, the nanotube ends are brought into contact with a molten carbon-dissolving material (FIG. 3A) or a solid metal having high carbon solubility (FIG. 3B). In another embodiment, the aligned nanotubes are embedded in a solid matrix, which is sectioned or polished, and then etched to provide protruding nanotubes (FIG. 4).

The resulting structure maintains the aligned nanotube orientation, but further exhibits nanotubes of uniform height, having sharp, cap-free tips useful for field emission.

DETAILED DESCRIPTION OF THE INVENTION

Nanotube Emitter Structure and Fabrication Method

Figure 1:
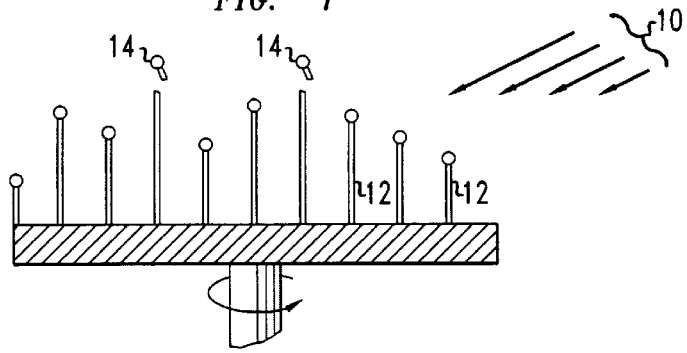
FIG. 1 illustrates one embodiment for truncating aligned nanotubes according to the invention.

In design and fabrication of efficient, powerful, and reliable field emitters, high emission current density is desirable, and is capable of being attained by increasing the density of nanotubes on the emitter surface. Providing a high-density of carbon nanotubes on an emitter surface has been relatively difficult, in part because nanotubes generally resemble an aggregate of loosely-tangled needles or spaghetti-shaped wires of non-uniform height, and in part due to the problems of attaching nanotubes to a conducting substrate. The recently-discovered techniques for forming aligned nanotube arrays, however, make such high density more readily attainable.

In addition, electron field emission is enhanced when the geometrical feature of the emitter is made small, due to the concentration of electrical field near sharp tips. Carbon nanotubes' small diameter, e.g., as small as 1.3 nm, provides an effective field concentrating feature. However, the ends of the nanotubes provide even smaller radii of curvature for enhanced field concentration and electron emission. In fact, electron emission from nanotube tips is easier than emission from the sides, e.g., tip emission occurs at much lower field levels. It is thus advantageous to form a nanotube field emitter structure having an increased number of nanotube ends exposed. Moreover, it is even more useful to have sharp, uncapped ends oriented toward the anode of an emitter device, as provided by the invention.

Another important structural feature of a nanotube field emitter is the height of the protruding tips from the surface of the substrate. The uniformity of protrusion is important in order to increase the number of nanotube tips participating in emission. Specifically, because of the shielding of local electrical field by the highest protruding tips, the contribution to the field emission would be dominated by these highest tips, with nearby, less protruding, tips making a reduced contribution. Thus, for field emission applications, the truncated nanotubes advantageously have a height within 30% of the reference distance, more advantageously within 10%. The reference distance is the smaller of the average height of the truncated nanotubes (from a substrate surface) and the average distance between neighboring nanotubes. For applications other than emission, e.g., energy storage, the truncated nanotubes advantageously have a height within 30% of the average truncated nanotube height, more advantageously within 10%.

For these reasons, the invention, by truncation of aligned nanotube arrays, provides a structure exhibiting improved emitter density and emission current density. The fabrication of the emitter structures is as follows.

An aligned carbon nanotube ensemble is fabricated or obtained. The precise mechanism of aligned nanotube growth is not clearly understood, but methods for attaining the growth are known, as discussed above. Such fabrication methods include chemical vapor deposition, electric arc discharge, and laser ablation. It is possible to enhance the aligned growth by an applied or a naturally-present electric field (e.g., in the growth plasma) during the nanotube synthesis. Other techniques, such as the use of temperature gradient, are also suitable for promoting the aligned growth of nanotubes.

The nanotubes are then truncated to provide uniform height nanotubes having sharp tips. It is possible that after truncation, small diameter carbon hemispheres will form on the truncated ends. As discussed above, such hemispheres are not considered to be caps if the diameter is no more than the diameter of the nanotube itself. The average nanotube diameter is in the range of about 1.3–200 nm depending on whether the nanotubes are single-walled, multiwalled or bundled-single-wall types. (Single wall nanotubes tend to exhibit a typical diameter on the order of 1 to 5 nm, and are often made in the form of a bundle. Multi-wall nanotubes contain many concentric graphite cylinders and tend to exhibit a typical diameter on the order of 10 to 50 nm. The aspect ratio for both types is typically 100 to 10,000.) The average height of the aligned, truncated nanotubes from a supporting substrate according to the invention is typically in the range of 0.01–1000 µm, preferably in the range of 0.1–100 µm.

According to one embodiment of the invention, reflected in FIG. 1, a high-energy beam 10 is used to truncate a ensemble of aligned nanotubes 12. Suitable beams include, but are not limited to, laser beams, electron beams, and ion beams (e.g., argon or oxygen plasma). Ion beams or plasma beams are advantageous. It is possible to utilize, for example, a point source beam, a multiplicity of parallel beams, or a planar beam, either in a stationary mode or in a scanning mode of illumination. Typically, the substrate is rotated to improve truncation uniformity. The nanotubes 12, at the point where the beam makes contact, is evaporated and the nanotubes are truncated one after another as the beam propagates through the aligned nanotubes. A light vacuum suction or a gentle gas blow is optionally utilized, especially in the case of a laser beam, to sweep away debris 14. The taller nanotubes tend to absorb the incoming beam and evaporate, thereby shielding the shorter nanotubes, and the beam inclination is advantageously set such that this shadowing effect is attained. Advantageous inclinations will typically be within a factor of 3 of (1 nm/dN) measured in radians, wherein dN is the average distance between neighboring nanotubes. For samples with a low density of nanotubes, however, the collimation requirements on the beam and flatness requirements on the substrate make this embodiment relatively difficult.

The desired level of beam energy substantially depends on the nature of the beam, the size and density of nanotube array samples, and the mode of beam operation. For example, in the case of an argon-ion beam, incident at 3°, a typical particle energy is about 1 keV, and a typical total dose is about $10^{-18} cm^{-2}$.

Figure 2:
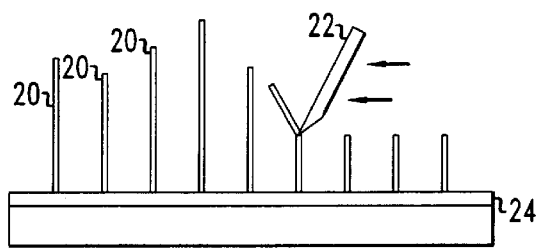
FIG. 2 illustrates another embodiment for truncating aligned nanotubes according to the invention.

FIG. 2 schematically illustrates another embodiment for truncating an aligned carbon nanotube array, using an oxidizing atmosphere and a temperature gradient. Essentially all forms of solid carbon burn in the presence of an oxygen-containing atmosphere at high temperature, thereby forming a gas e.g., CO or $CO_2$. The burning and opening of carbon nanotube ends has been demonstrated, as shown for example in P. M. Ajayan et al., "Opening carbon nanotubes with oxygen and implications for filling," *Nature*, Vol. 362, 522 (1993). However, the reactions have been carried out on randomly-oriented nanotubes with no control of the degree of opening or the length of the resulting nanotubes.

In contrast, according to this embodiment, a portion of aligned carbon nanotubes 20 at an ambient or low temperature is heated in a controlled and predetermined manner by contact with a heated body, e.g., a hot blade 22, using, for example, a sliding, sweeping, or rotating motion. The heated body provides a temperature gradient—high temperature at the top portion of the nanotubes 20, and a lower temperature at the bottom portion. Those portions of the nanotubes 20 which reach a critical temperature, e.g., about 400° C. or higher, react with oxygen and burn away. The critical temperature for nanotube burn depends on the oxygen partial pressure in the atmosphere, the time of contact between the hot blade and the carbon nanotubes, as well as the diameter of the each nanotube (or each bundle of nanotubes). The use of a hot blade 22 of particular shape, or other sharp, focused body, reduces the extent of burning of already-truncated nanotubes. Advantageously, a spacer is used to maintain a certain sweep height above the supporting substrate 24 (e.g., a pair of constant-height rails placed near the edge of the nanotube array sample). It is possible to use a single sweep or several sweeps of the blade 22.

The heated body is generally formed from a metallic or ceramic material, and is of any suitable shape or form. It is heated to a desired temperature by any suitable technique. For example it is possible to place the body in a furnace to reach the desired temperature, to heat the body in situ, e.g., a razor blade partially located within a torch flame, or to use an electrically-heated material, e.g., a highly resistive heating-element alloy. It is also possible to use a flame itself, providing the flame direction and intensity is well-controlled. (For purposes of the invention, such a flame is considered to be a heated body.) The temperature of the blade tip which contacts the nanotube is at least 400° C., advantageously at least 600° C. Depending on the desired level of control and desired speed of truncation, it is possible to use, for example, a 100% oxygen atmosphere or a diluted oxygen atmosphere (e.g., air or 5% $O_2$ in Ar). It is also possible to use a full or partial carbon dioxide atmosphere. Control samples are easily used to determine appropriate conditions for truncation of the nanotubes according to this embodiment.

Figure 3A:
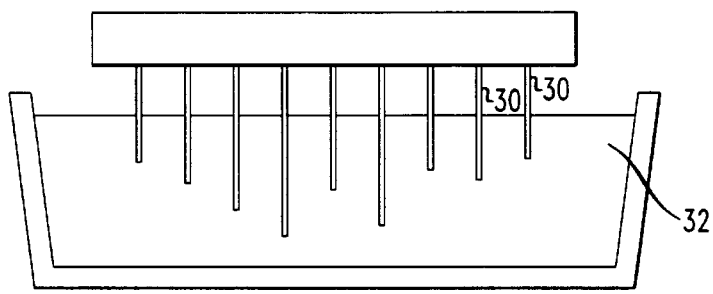
FIGS. 3A and 3B illustrate further embodiments for truncating aligned nanotubes according to the invention.
Figure 3B:
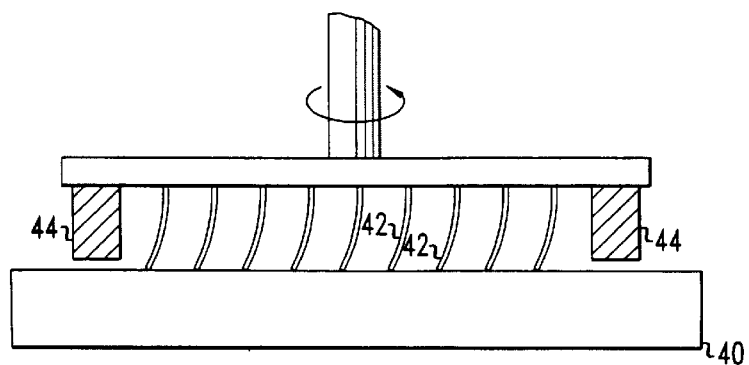

In another embodiment, nanotube truncation is performed by dissolving carbon from the nanotube ends into a molten metal (FIG. 3A) or solid metal (FIG. 3B). Carbon's relatively high solubility in certain liquid or solid metals is well known. As illustrated in FIG. 3(a), the growth ends of the aligned nanotubes 30 are dipped into a molten, carbon-dissolving (i.e., carbon-soluble) metal 32 to the level of desired truncating height, and then removed from the melt and cooled. To avoid oxidation of the melt, the reaction is advantageously performed in an inert atmosphere such as Ar or in a reducing atmosphere such as $H_2$. If desired, any remnant metal coating or debris near the truncated nanotube ends are acid-dissolved to expose clean, truncated tips. In utilizing liquid solubility for nanotube truncating in the present invention, molten metals with both a relatively low melting point and a high solubility for carbon are advantageously used, although higher melting point metals such as iron are also possible. For example, rare earth metals such as Ce (melting point=798° C.; liquid solubility of carbon at ~900° C. of ~25 atomic % carbon), and La (melting point= 918° C.) are useful. It is also possible to use even lower-melting point alloys of such materials, e.g., Ce with 28 atomic % Cu (melting point=424° C.), or La with 30 atomic % Ni (melting point=532° C.). Various other alloys are also useful, particularly alloys containing at least one rare earth metal and at least one non-rare earth metal, such as a transition metal.

FIG. 3B illustrates use of a solid-state diffusional dissolution of carbon, as opposed to use of a molten metal.

Specifically, a solid metal or alloy 40 with high solid-solubility of carbon, such as Ce, La, La—Ni, Fe, or Mn, is heated to a high temperature, e.g., 400–1000° C. in an inert or reducing atmosphere. The aligned nanotubes 42 are then gently rubbed against the hot solid metal 40, advantageously in a repeated sweep motion, until a desired length of the carbon nanotube 42 ends are dissolved by solid state diffusion. It is possible for the rubbing motion to be linear, rotational or a random motion. At least one spacer 44 is advantageously used between the nanotubes 42 and the hot, carbon-dissolving metal 40 in order to control the truncating height. In this solid state approach, the temperature of the carbon-dissolving solid metal or alloy is advantageously maintained at least 20° C. below its melting point.

Another embodiment for truncating aligned carbon nanotubes is illustrated in FIGS. 4A–4D. According to this embodiment, the aligned carbon nanotubes 50 are substantially encapsulated in a solid matrix 52, as reflected in FIGS. 4A and 4B. The encapsulation is performed using any suitable matrix materials, including metals, polymers (including epoxies), ceramics, or composite materials. For example, a molten metal or alloy of low melting point solder is infiltrated into the nanotube array and then allowed to solidify. Advantageously, such a metal or alloy contains a small admixture of a carbide-forming element for improved wetting of the nanotubes (e.g., Ti, V, Cr, Mn, Fe, Zr, Nb, Mo, Hf, Ta, W). Typically, the number of carbide-forming element atoms is nor more than 50% of the number of carbon atoms in the nanotubes. It is also possible to encapsulate the nanotubes in a metal salt solution such as $CuCl_2$, $CUSO_4$, or $InCl_3$ dissolved in water or solvent, optionally containing a water- or solvent-soluble binder, by infiltrating the nanotube array, drying the composite, and baking the composite to reduce the metal salt to a metallic matrix. Polymer encapsulants (electrically conductive or nonconductive) are also useful.

Figure 4A:
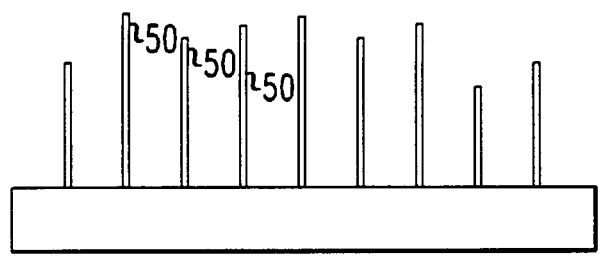
FIGS. 4A–4D illustrate an additional embodiment for truncating aligned nanotubes according to the invention.
Figure 4B:
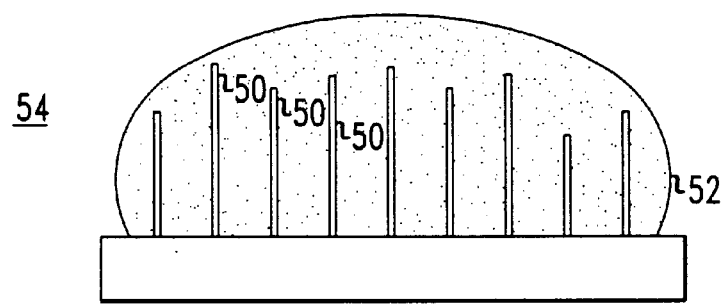
Figure 4C:
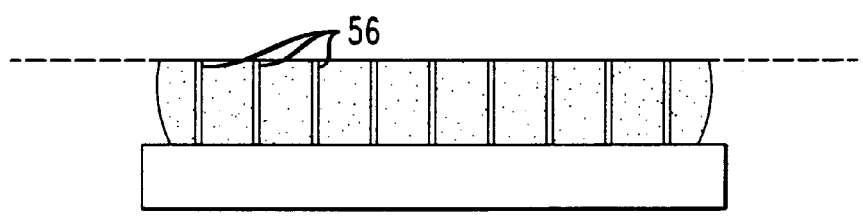
Figure 4D:
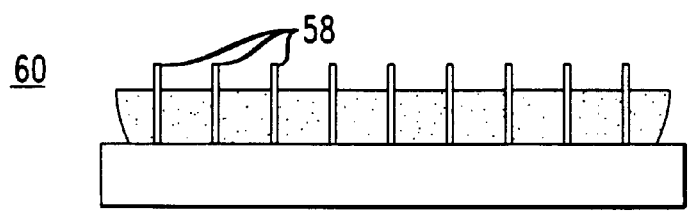

The composite structure 54, containing aligned nanotubes 50 embedded in a solid matrix 52 is then sectioned or polished parallel to the nanotube array substrate in order to provide truncated nanotubes 56, as shown in FIG. 4C. The sectioned or polished surface of this structure is then lightly etched, e.g., by acid or base in the case of metal matrix, or by water or solvent in the case of water-soluble or solvent-soluble matrix. This last processing step creates a desired structure 60 containing protruding nanotubes 58 with truncated ends and relatively uniform height.

The aligned and truncated nanotube array structure prepared according to the invention is useful for a variety of devices including microwave vacuum tube devices, flat panel field emission displays, and hydrogen storage devices, as described below.

Devices Incorporating Nanotube Emitter Structures

The emitter structures formed as discussed above are useful for a variety of devices, including microwave vacuum tube devices and flat panel field emission devices. Because efficient electron emission at low applied voltages is typically achieved by the presence of accelerating gate electrode in close proximity to the emitting source (typically about 1–10 μm distance), it is advantageous to have numerous gate apertures in an emitter structure to enhance the capability of the structure. Specifically, a fine-scale, micron-sized gate structure with numerous gate apertures is advantageous for attaining high emission efficiency.

Accordingly, in the emission devices of the invention, a grid structure is advantageously formed in front of the nanotube emitter structure described herein. The grid is a conductive element placed between the electron emitting cathode and the anode. It is separated from the cathode but sufficiently close to the nanotube emitter to excite emissions (typically within 10 μm of the emitting nanotube tips), Yet, this close spacing is possible only if the emitter tips have relatively uniform height. As discussed previously, the fabrication process of the invention provides nanotube tips exhibiting such uniformity.

The grid is generally separated from the cathode by an electrically insulating layer such as aluminum oxide or silicon dioxide. Advantageously, the grid structure in the invention contains an electrically conducting layer, e.g., a thin film or thin foil, with a multitude of apertures. Within each aperture, a multiplicity of nanotubes emit electrons when a field is applied between the cathode and the grid.

The dimension of the grid apertures is typically in the range of 0.05–100 μm in average maximum dimension (e.g., diameter), advantageously at least 0.1 μm, and more advantageously at least 0.2 μm to ease manufacturing. The average maximum dimension is advantageously no more than 20 μm, more advantageously no more than 5 μm in order to increase the density of grid apertures, and reduce the voltage necessary to achieve electron emission. Circular apertures are advantageous in that they provide a desirable collimated electron beam with relatively low perpendicular momentum spread. The thickness of the grid conductor is typically in the range of 0.05–100 μm, advantageously 0.05–10 μm. The grid conductor material is typically chosen from metals such as Cu, Cr, Ni, Nb, Mo, W or alloys thereof, but the use of conductive ceramic materials such as oxides, nitrides, and carbides is also possible. The apertured (or perforated) grid structure is typically prepared by conventional thin film deposition and photolithographic etching.

Figure 5:
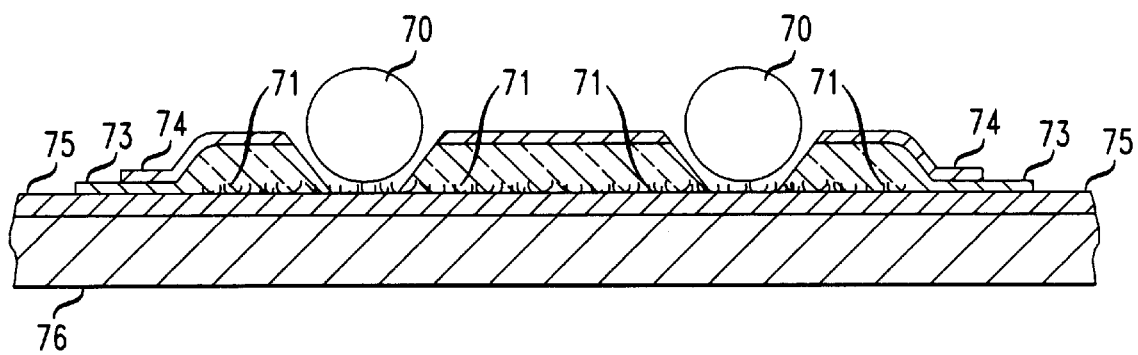
FIG. 5 illustrates a nanotube cathode formed according to the invention.

Advantageously the grid is a high density apertured gate structure such as described in U.S. Pat. Nos. 5,681,196 and 5,698,934, the disclosures of which are hereby incorporated by reference. The combination of very fine and high-density nanotube emitters with a high-density gate aperture structure is particularly advantageous. Such a high density gate aperture structure is conveniently formed by utilizing micron or submicron sized particle masks. Specifically, after formation of the nanotube emitter structure, mask particles (metal, ceramic, or plastic particles typically having maximum dimensions less than 5 μm and advantageously less than 1 μm) are applied to the emitter surface, e.g., by spraying or sprinkling. A dielectric film layer such as $SiO_2$ or glass is deposited over the mask particles as by evaporation or sputtering. A conductive layer such as Cu or Cr is deposited on the dielectric. Because of the shadow effect, the emitter areas underneath each mask particle have no dielectric film. The mask particles are then easily brushed or blown away, leaving a gate electrode having a high density of apertures. FIG. 5 illustrates such a particle mask technique. The mask particles 70 are located above the protruding nanotube emitters 71. Upon deposition of the insulating layer 73 and the grid conductor layer 74 onto conductor 75 on substrate 76, the mask particles 70 block portions of the nanotube emitters 71. When the mask particles 70 are removed, nanotubes 71 are exposed through the resultant apertures. The resultant structure is then capable of being incorporated into a device.

Figure 6:
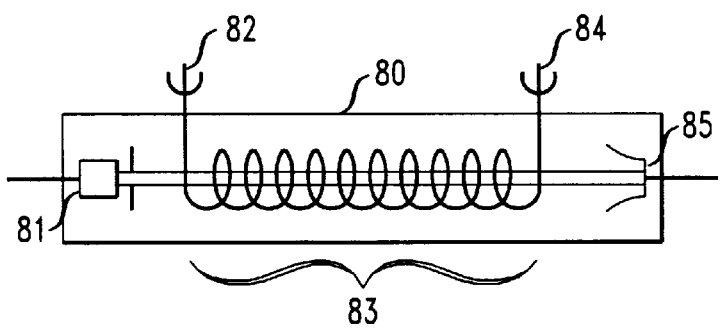
FIG. 6 illustrates a traveling wave tube structure.

FIG. 6 is a schematic cross section of a typical microwave vacuum tube device—here a traveling wave tube (TWT). The tube device contains an evacuated tube 80, a source of electrons in the form of an electron gun 81, an input window 82 for introducing a microwave input signal, an interaction structure 83 where the electrons interact with the input signal, and a microwave output window 84 where microwave power derived from the electrons is taken out of the tube. In the case of a TWT, other components include a focusing magnet (not shown) to focus the beam of electrons through the interaction structure 83, a collector 85 to collect the electron beam after the output microwave power has been generated and an internal attenuator (not shown) to absorb microwave power reflected back into the tube from mismatches in the output. For a TWT, the interaction region 83 is typically a conductive helix for broadband applications and a coupled-cavity region for high power applications.

Figure 7:
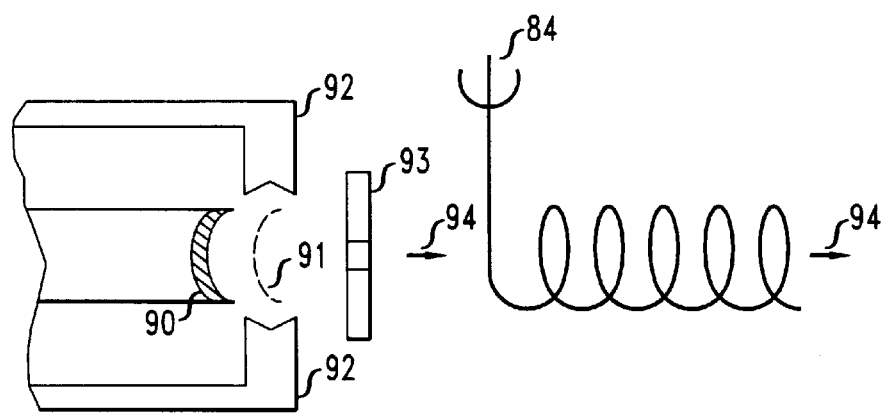
FIG. 7 illustrates an enlarged view of the electron gun structure of the traveling wave tube of FIG. 6.

The electron gun 81 is an electron source that generates, accelerates and focuses an electron beam to follow a desired trajectory after it leaves the gun. FIG. 7 illustrates a conventional electron gun comprising a thermionic cathode 90, one or more grids 91 for inducing emission of electrons, focusing electrodes 92 for focusing the electrons into a beam, and apertured anode 93 for further directing the beam 94 into interaction structure 83. For TWT applications, a long, thin electron beam at relatively low voltage and high current density is advantageous. Electron guns range in configuration from a planar cathode faced by a planar anode to more elaborate designs such as Pierce guns, conical diode electrodes, concentric cylinders or spherical cap cathodes. (See, e.g., A. W. Scott, supra.)

In operation of the device shown in FIGS. 6 and 7, an electron beam 94 is accelerated from the cathode 90 by high voltages applied to grids 91 and anode 93. The electron beam is then shot into the interaction structure 83 where it interacts with the microwave input signal such that the beam 94 is amplified as the electrons and the signal travel together through the interaction structure 83. The electrons advantageously travel at the same velocity as the microwave signal on the interaction structure 83. The power of the input signal modulates the electron beam 94, and the modulated electron beam 94 generates an amplified form of the input signal at the output 84.

The cathode 90 and grid 91 are the source of electrons for the electron beam in the TWT of FIG. 6. The cathode advantageously has the following properties and capabilities: (1) exhibit a surface able to emit electrons freely without the necessity of external excitation such as heating or bombardment, (2) supply a high current density, (3) long operating life with its electron emission continuing substantially unimpaired, (4) allow production of a narrow beam with a small spread in electron momentum, and (5) allow production of a modulated electron beam at or near the cathode. In contrast to conventional thermionic cathodes, cold cathodes comprising aligned protruding nanotube emitters exhibit these properties. Specifically, nanotube-based cold cathodes are capable of fast, room-temperature emission when an electric field is applied. They allow the production of a modulated electron beam over a distance of a few microns (as in the case of beam modulation performed directly by the grids), permitting the use of a shortened interaction region and resulting in a lighter, more compact device.

When using nanotube-based cold cathodes in microwave vacuum tube devices, it is desired to keep electron beam spread within a reasonable level. Electrons emerge from the cathode surface with a nonzero velocity and at various angles to the surface normal. The field-emitted electrons thus have a distribution of momentum values in the direction of electron beam trajectory. These effects—random emission of electrons, undesirable momentum perpendicular to the path from the cathode to the anode and the resulting crossing of electron trajectories on the microscopic scale—all reduce the performance of the microwave amplifier by giving rise to shot noise as well as affecting the minimum diameter that a convergent beam can attain. It is therefore desirable to inhibit electron beams from different apertures in the grid from merging unless the electron beams are nearly parallel. Specifically, if the beams merge while individually diverging, the phase space density of the resultant beam will be lowered, because at any given point electrons are found with a variety of different momenta.

It is possible to reduce the divergence angle of the electrons from each aperture by creating an electrostatic lens in the aperture. However, Liouville's Theorem constrains the extent to which a lens is able to reduce the perpendicular momentum spread. If the emitting area is equal to the lens aperture, then no substantial improvement is obtained. If the emitting area is smaller than the lens aperture, it is possible to reduce the perpendicular momentum distribution (with proper lens design) by the ratio of the radius of the emitting area to the radius of the lens.

It is therefore desirable to allow emission only from small spots near the center of each aperture, i.e. at most 70% of the area and advantageously at most 50% of the area of the aperture. It is possible to control the emission by patterning the substrate so that for a plurality of the emitting apertures, only a small area (smaller than the aperture area) is electrically conductive. It is also possible by controlling nanotube incorporation process so that only the central area within the emitting aperture is activated and emits electrons, e.g., by depositing a non-emissive overlayer on the nanotube emitters everywhere but at the center of the apertures.

Figure 8:
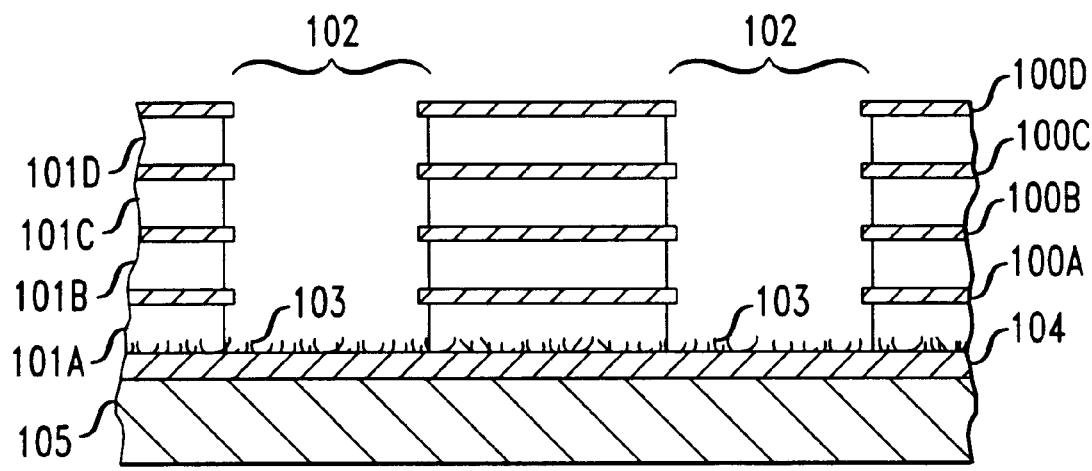
FIG. 8 illustrates a multiple grid structure designed for extracting, accelerating and focusing an electron beam from a nanotube cathode surface according to the invention.

A multilayer, apertured grid is useful for reducing the divergence angle. In such a multilayer grid, the first grid is operated at a negative potential. The first grid is typically 0.05 to 10 of its average maximum aperture dimension (e.g., diameter in the case of round apertures) above the cathode, advantageously 0.3 to 2. Typically, the apertures are round and have a diameter of 0.05 to 100 $\mu$m, advantageously at least 0.1 $\mu$m, more advantageously at least 0.2 $\mu$m. This first grid reduces the electric field at the cathode surface, near the edge of the hole, and thereby suppresses emission preferentially from the edge. Successive grids typically exhibit positive voltages relative to the cathode. The multilayer grid structure has at least two layers and advantageously at least 4 layers of grid conductors, as illustrated in FIG. 8. Grid conductors 100A, 100B, 100C, 100D are separated by insulators 101A, 101B, 101C, 101D, and define aligned apertures 102. Nanotube emitters 103 located within each aperture 102 are supported by a cathode conductor 104, which is located on a substrate 105. The grid conductors 100A–100D allow the electron beams to be focused during traveling. The first grid layer closest to the emitters (100A) is generally biased negative to reduce the perpendicular momentum through suppression of field emission near the edge of the grid apertures 102. A negative bias on the first grid also focuses a diverging electron beam into one that has momenta more nearly parallel to the surface normal. (A single grid provides similarly useful properties if the field applied by the anode is sufficiently large to force emission even in the presence of a negative charged grid. However, multiple grids are advantageous in reducing the required voltage on the anode, and in providing a better collimated electron beam.)

The multilayered grid structure is prepared by conventional thin film deposition and photolithographic techniques. It is also possible to prepare the grid structures of FIG. 8 by a particle mask technique as discussed previously, as illustrated in FIGS. 9 and 10. The thickness of the grid conductor layers 100A–100D is typically in the range of 0.05 to 100 µm, advantageously 0.1 to 10 µm. The grid conductor layers are generally selected from a metal such as Cu, Cr, Ni, Nb, Mo, W, or alloys thereof, but the use of conductive ceramics such as oxides, nitrides, and carbides is also possible. The insulator layers 101A–101D are typically formed from materials such as silica or glass.

Figure 9:
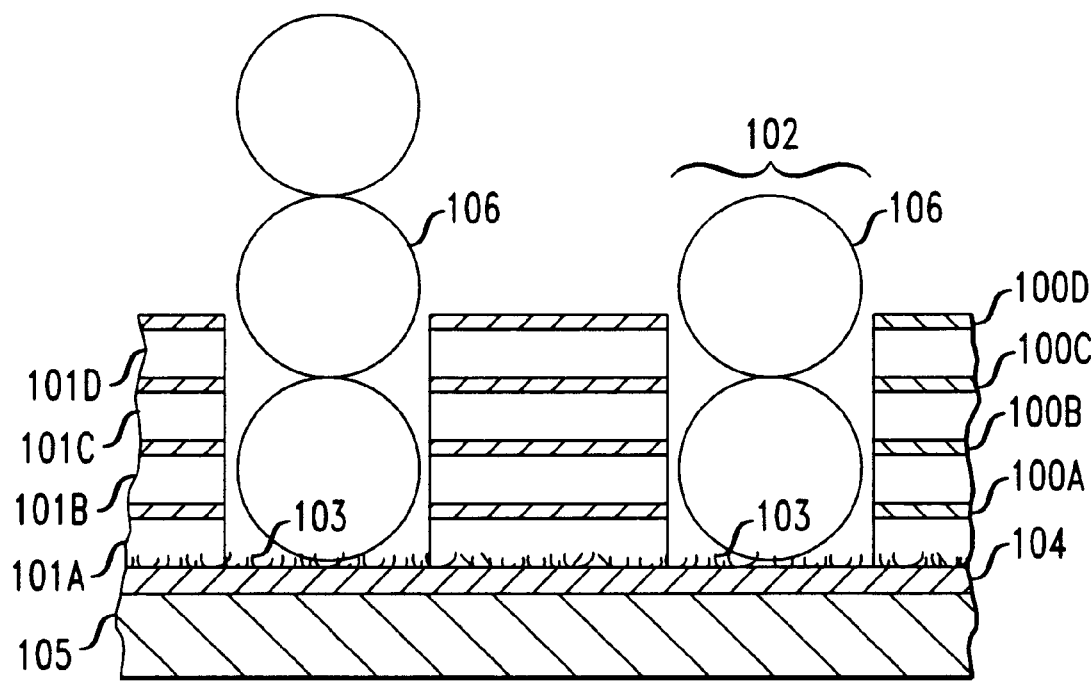
FIG. 9 illustrates preparation of a multilayer grid structure using magnetic mask particle stacks.

In FIG. 9, the mask particles 106 are typically ferromagnetic (e.g. Fe, Ni, Co, or their alloys). Desirable particle size is typically in the range of 0.1–20 µm in average diameter. During the placement of the particles, e.g. by sprinkling onto the nanotube emitter structure, a vertical magnetic field is applied, which causes the ferromagnetic particles 106 to form a vertically elongated chain-of-spheres containing at least 2 particles. Some chains-of-spheres may have more particles than others, but this does not matter for the purpose of depositing the multilayer grid structure. After alternating deposition of insulating spacer film (101A–101D) and the grid conductor film (100A–100D) into multilayer stacks, the ferromagnetic particles 106 are removed, e.g., by magnetically pulling away using a permanent magnet, or by chemical etching.

Figure 10:
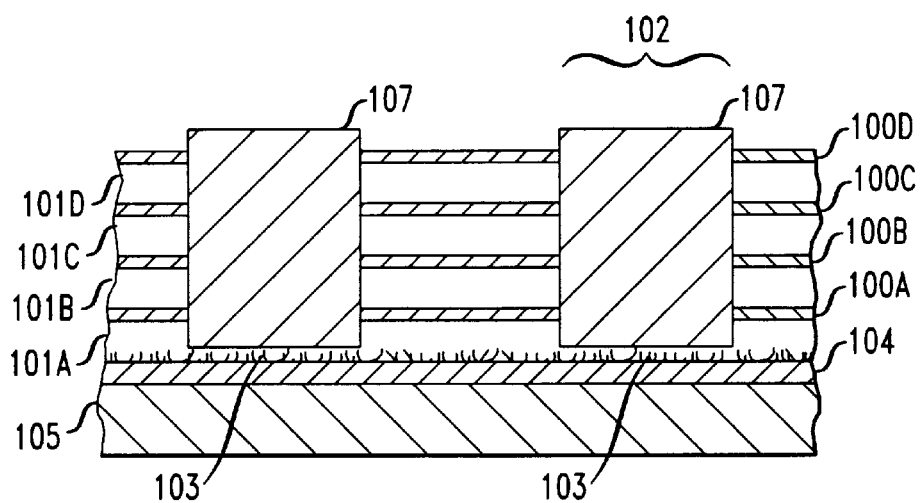
FIG. 10 illustrates preparation of a multilayer grid structure using elongated mask particles.

An alternative particle mask approach is schematically illustrated in FIG. 10. In this alternative approach, elongated or prolate ferromagnetic particles 107 are sprinkled in the presence of vertical magnetic field so that they stand up vertically to serve as mask particles during the deposition of the multilayer grid structure (100A–100D and 101A1–101D) on substrate 105, conductor layer 104 and nanotube emitters 103. The particle mask is then removed as discussed previously. The elongated mask particles 107 typically have an average axial maximum dimension, e.g., diameter, in the range of 0.1–20 µm. It is possible to prepare the particles 107, for example, by thin film deposition (e.g. by sputtering, evaporation, electroless plating) of the mask material through a perforated template (not shown) placed at a desired height above the nanotube emitters. Suitable materials for the elongated mask particles 107 include metals such as Cu, Al, Ni, easily water or solvent dissolvable polymers (e.g., polyvinyl acetate, polyvinyl alcohol, polyacrylamide, acrylonitrile-butadiene-styrene or ABS), volatile polymers (e.g., PMMA), or easily dissolvable salts (e.g., NaCl). After deposition of the particles, the template is removed, and the multilayer grid structure formed.

The cathode and gate structure of FIG. 8, as used in a microwave amplifier, is not necessarily flat in surface geometry. It is possible to use a reshaped bulk nanotube composite emitter, or a curved substrate having thin film array emitters deposited thereon. The curved substrate is prepared, for example, by etching or mechanical polishing (e.g., in the case of materials such as Si) or by plastic deformation (e.g., in the case of ductile metals such ad Cu, Mo, Nb, W, Fe, Ni, or alloys thereof).

Advantageously, the nanotube-containing cathode and multilayer grid structure of FIG. 8 is used in a TWT, instead of a thermionic emission cathode. Also, the cathode/grid structure of FIG. 8 is advantageously slightly concave for focusing the emitted electrons into a beam.

The nanotube emitter structure of FIG. 8 reduces the perpendicular momentum spread of electrons emitting from the cathode due to four features. (1) Low voltage emission is desirable to have reduced beam spreading. If the emitter geometry is held constant, the perpendicular momentum spread scales as the square root of the emission voltage. The use of protruding nanotube emitters allows low voltage emission and hence reduced perpendicular momentum in microwave amplifier operation. (2) Electron emission is restricted to the central area portion, which is much smaller than the entire grid aperture area. (3) The electron beam is focused by the stack of the multilayer grid structure. (4) A concave substrate further focuses the electron beam.

It is also possible to use the nanotube-based emitters of the invention to fabricate a flat panel, field emission display. Such a field emission display is constructed, for example, with a diode design (i.e., cathode-anode configuration) or a triode design (i.e., cathode-grid-anode configuration). Advantageously, a grid electrode is used, more advantageously a high density aperture gate structure placed in proximity to the nanotube emitter cathode, as discussed previously.

For display applications, emitter material (the cold cathode) in each pixel of the display desirably consists of multiple emitters for the purpose, among others, of averaging out the emission characteristics and ensuring uniformity in display quality. Because of the nanoscopic nature of the carbon nanotubes, the emitter provides many emitting points, typically more than $10^4$ emitting tips per pixel of $100\times100\,\mu m^2$, assuming 50% nanotube density with a tubule diameter of 10–100 nm. Advantageously, the emitter density in the invention is at least $1/\mu m^2$, more advantageously at least $10/\mu m^2$. Because efficient electron emission at low applied voltage is typically achieved by the presence of accelerating gate electrode in close proximity (typically about 1 micron distance), it is useful to have multiple gate apertures over a given emitter area to utilize the capability of multiple emitters. It is also desirable to have a fine-scale, micron-sized structure with as many gate apertures as possible for increased emission efficiency.

Figure 11:
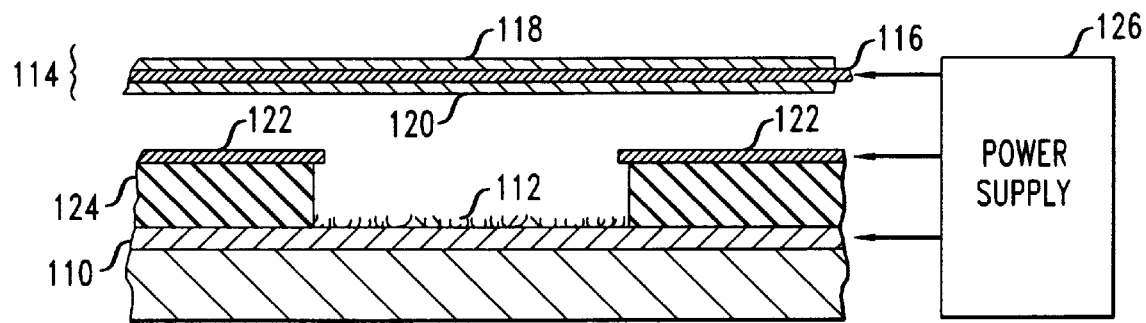
FIG. 11 illustrates a flat panel field emission display according to the invention.

FIG. 11 illustrates a flat panel field emission display using a nanotube emitter structure of the invention. The display contains a cathode 110 including a plurality of nanotube emitters 112 and an anode 114 disposed in spaced relations from the emitters 112 within a vacuum seal. The anode conductor 116 formed on a transparent insulating substrate 118 is provided with a phosphor layer 120 and mounted on support pillars (not shown). Between the cathode and the anode and closely spaced from the emitters is a perforated conductive gate layer 122. Conveniently, the gate 122 is spaced from the cathode 110 by an insulating layer 124.

The space between the anode and the emitter is sealed and evacuated, and voltage is applied by power supply 126. The field-emitted electrons from the nanotube emitters 112 are accelerated by the gate electrode 122, and move toward the anode conductor layer 116 (typically a transparent conductor such as indium-tin oxide). As the accelerated electrons hit the phosphor layer 120, a display image is generated.

It is also possible to use the truncated nanotube structures of the invention for energy storage devices, such as lightweight, high-energy density batteries. It is known that nanopores of molecular dimensions are able to uptake, e.g., adsorb, large amount of gases. For example, open-ended carbon nanotubes uptake three times more hydrogen than virgin (as-grown) nanotubes having capped ends. See, e.g., A. C. Dillon et al., "Storage of hydrogen in single-walled carbon nanotubes," *Nature*, Vol. 386, 377 (1997). Improved hydrogen uptake is desired for energy storage applications, such as efficient fuel-cells for electric vehicles. The truncated, high-density, uniform height nanotube structure of the invention provides a large concentration of open nanotubes ends that are simultaneously open to hydrogen adsorption, and thus offers useful properties for hydrogen storage.

Similarly, the truncated nanotube structure is amenable to relatively easy uptake of molten alkali metals such as lithium, sodium, potassium, and cesium, which tend to form graphite intercalation compounds. The electrolytic storage of lithium ions in graphite-type materials is reversible, as is known for lithium-ion batteries. See, e.g., J. R. Dahn et al., "Mechanisms for Lithium Insertion in Carbonaceous Materials," *Science*, Vol. 270, 590 (1995). It is therefore possible to use the truncated nanotube structure of the invention as an efficient negative electrode in secondary (rechargeable) batteries such as lithium-ion batteries. In particular, the low density of carbon nanotubes would provide a high energy density per unit battery weight.

Other embodiments of the invention will be apparent to those skilled in the art from consideration of the specification and practice of the invention disclosed herein.

What is claimed is:

1. A process for fabricating an article, comprising the steps of:

providing an array of aligned carbon nanotubes;

truncating at least a portion of the nanotubes, such that at least 10% of the truncated nanotubes are free of end caps.

2. The process of claim 1, wherein at least 50% of the truncated nanotubes are free of end caps.

3. The process of claim 1, wherein the truncated nanotubes have a height within 30% of a reference distance, the reference distance being the smaller of the average height of the truncated nanotubes and the average distance between neighboring nanotubes.

4. The process of claim 1, wherein the truncated nanotubes have a height within 30% of the average height of the truncated nanotubes.

5. The process of claim 1, wherein the truncating step comprises directing a high energy beam at the nanotubes.

6. The process of claim 5, wherein the high energy beam is selected from a laser beam, an electron beam, and an ion beam.

7. The process of claim 1, wherein the truncating step comprises applying a temperature gradient to the nanotubes in an oxygen-containing atmosphere, such that a portion of the nanotubes burn away.

8. The process of claim 7, wherein the temperature gradient is provided by contacting the nanotubes with a heated body.

9. The process of claim 8, wherein the heated body comprises a heated blade.

10. The process of claim 9, wherein the blade is heated to at least 400° C.

11. The process of claim 1, wherein the truncating step comprises dissolving carbon from the nanotube ends by contact with a carbon-soluble material.

12. The process of claim 11, wherein the carbon-soluble material comprises a rare earth metal and a non-rare earth metal.

13. The process of claim 12, wherein the carbon-soluble material comprises at least one of Ce, La, Fe, and Mn.

14. The process of claim 11, wherein the carbon-soluble material is molten and the nanotube ends are placed in the molten material.

15. The process of claim 11, wherein the carbon-soluble material is solid, and the nanotube ends are rubbed against the solid material.

16. The process of claim 1, wherein the truncating step comprises:

encapsulating the nanotubes in a solid matrix;

exposing nanotubes by at least one process selected from sectioning the matrix and polishing the matrix; and etching the matrix material away from the exposed nanotubes to provide protruding nanotubes.

* * * * *